Nov. 24, 1936.　　　　E. R. FITCH　　　　2,061,901
QUICK SERVICE VALVE MECHANISM
Filed Jan. 21, 1932
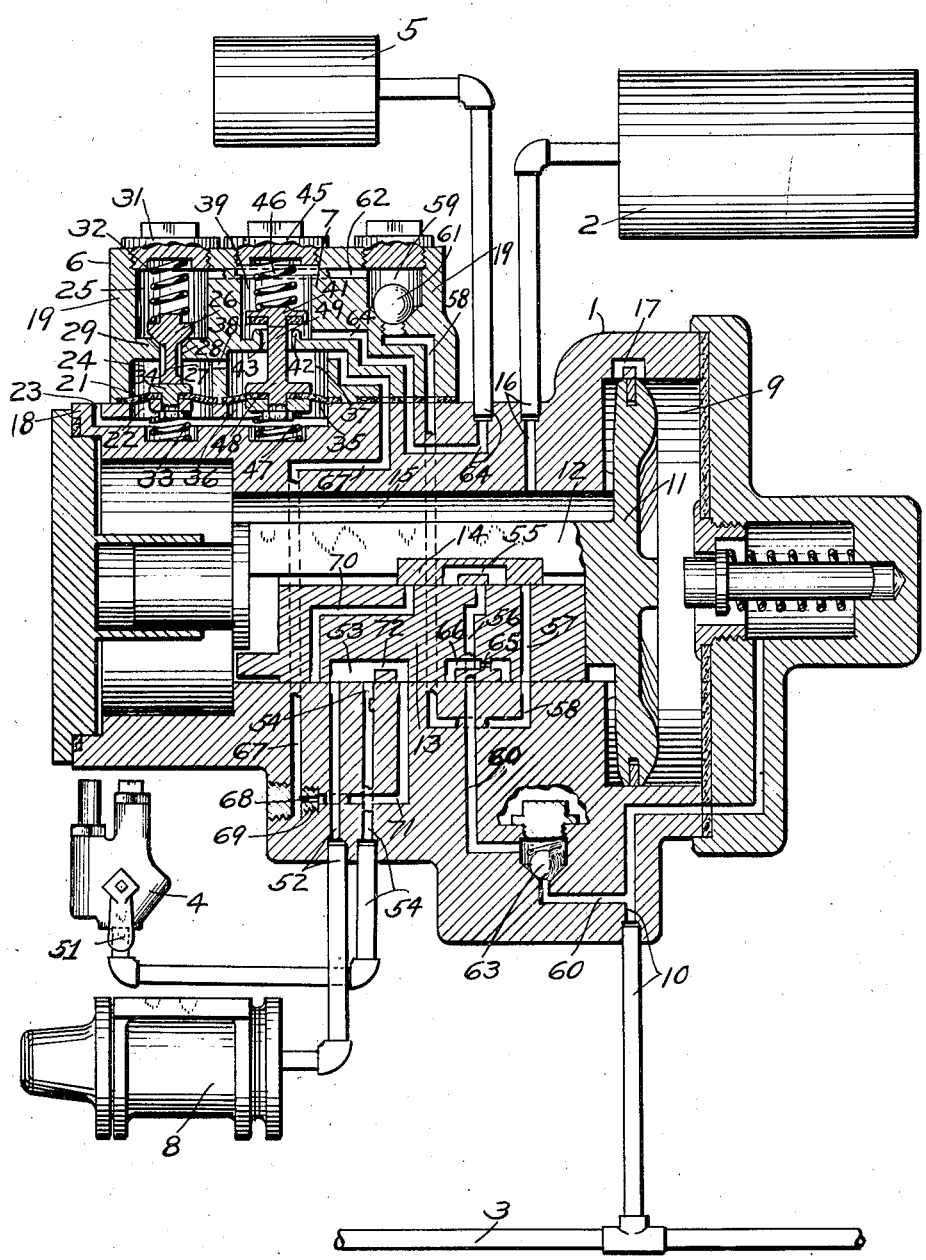
INVENTOR.
ELLERY R. FITCH
BY *Wm. M. Cady*
ATTORNEY.

Patented Nov. 24, 1936

2,061,901

UNITED STATES PATENT OFFICE 2,061,901

QUICK SERVICE VALVE MECHANISM

Ellery R. Fitch, Edgewood, Pa., assignor to The Westinghouse Air Brake Company, Wilmerding, Pa., a corporation of Pennsylvania Application January 21, 1932, Serial No. 587,910

17 Claims. (Cl. 303—38)

This invention relates to fluid pressure brakes and more particularly the well known automatic fluid pressure brake system, in which the brakes are applied by effecting a reduction in brake pipe pressure and are released by effecting an increase in brake pipe pressure, and which functions to vent fluid under pressure from the brake pipe to propagate quick service action serially throughout the length of a train.

In making an application of the brakes on a train, it is the usual practice to effect an initial light reduction in brake pipe pressure, causing the equipment to function to effect a light application of the brakes. The purpose of this light application of the brakes is to permit the slack in the train to gently run in or gather. After the slack has gathered, a further reduction in brake pipe pressure is effected, causing the braking force on the train to be increased.

In order to obtain a high brake cylinder pressure when trains are being operated on grades, it is usual to employ a normal brake pipe pressure which is higher than that employed on level road. For example, where seventy pounds normal brake pipe pressure is employed on level road service, ninety pounds may be employed in grade service.

Where local quick service action is obtained by venting fluid from the brake pipe to a bulb, if the volume of the bulb be fixed to effect such a drop in brake pipe pressure as will give the desired light brake application for trains where seventy pounds is the normal brake pipe pressure, then when ninety pounds is the normal pressure, the pressure in the brake pipe will be reduced to a greater extent than where seventy pounds is carried, with the result that the brake cylinder pressure obtained will be greater than desired.

When there is leakage from the brake pipe as is usually the case, the pressure in the brake pipe on the cars at the head end of the train will be higher than that on the cars at the rear of the train, so that there exists a gradient in pressure in the brake pipe from the front to the rear of the train.

In order to secure quick serial action throughout a train in effecting a service application of the brakes, it has heretofore been proposed to provide a bulb or reservoir of fixed volume into which fluid under pressure is locally vented from the brake pipe upon movement of the triple valve device toward service application position when a gradual reduction in brake pipe pressure is initiated by operation of the usual brake valve device.

If the volume of the quick service bulb be fixed so as to produce a reduction in brake pipe pressure on cars at the rear of the train such that the desired light initial application of the brakes be obtained on cars at the rear of the train, then due to the higher brake pipe pressure on cars at the front end of the train, the brake pipe pressure will be reduced on cars at the front end of the train to a greater extent, so that the brake cylinder pressure obtained on cars at the front end of the train will be greater than that obtained on cars at the rear, with the result that there will be a tendency for the slack in the train to run in at an excessive rate.

The principal object of this invention is to provide a fluid pressure brake equipment having the before mentioned quick service characteristics, wherein means are employed for obtaining a substantially uniform local quick service reduction in brake pipe pressure in the vicinity of each triple valve device of each car of the train regardless of the previously existing degree of brake pipe pressure in the vicinity of the triple valve, and to thereby so modify the degree of force of the brake application on the cars at the head end of the train that it approximates substantially the degree of brake application obtained on the cars at the rear of the train, regardless of the pressure gradient in the brake pipe, thereby preventing shock usually incident to the gathering of the slack.

Another object of the invention is to provide a fluid pressure brake equipment of the before mentioned type wherein a pressure responsive valve device is provided for limiting the quantity of fluid that may be vented into the bulb from the brake pipe to a predetermined amount regardless of the previously existing degree of brake pipe pressure, whereby a predetermined local reduction in brake pipe pressure is effected on all cars of the train, regardless of the position of a car in the train.

A further object of the invention is to provide a fluid pressure brake system employing a valve device and a bulb for effecting a local predetermined quick service reduction in brake pipe pressure for effecting a predetermined degree of brake application, and having means whereby the bulb is rendered ineffective during the well known cycling operation of the brakes.

These and other objects that will be made apparent throughout the further description of the invention are attained by means of the fluid pressure brake equipment hereinafter described and illustrated in the accompanying drawing wherein;

The single figure is a diagrammatic elevational view, partially in section, of a fluid pressure brake equipment embodying features of the invention.

According to the invention, the equipment may comprise a brake controlling valve device such as a triple valve device for each car of a train and which when a reduction in brake pipe pressure is made through the manipulation of the usual brake valve device, functions to effect an application of the brakes, means for effecting a local reduction in brake pipe pressure, and a quick service modifying valve device, which operates according to the pressure in a quick service bulb associated with each triple valve device, to so control the local venting of fluid from the brake pipe as to obtain a substantially uniform reduction in brake pipe pressure in the vicinity of each triple valve device for effecting a substantially uniform brake cylinder pressure on all of the cars of the train when a light quick service reduction in brake pipe pressure is effected.

As shown in the figure of the drawing, the fluid pressure brake equipment may comprise a triple valve device 1, an auxiliary reservoir 2, a brake pipe 3, a brake cylinder pressure retaining valve device 4, a quick service bulb or bottling chamber 5, a quick service modifying valve device 6, a check valve device 7, and a brake cylinder 8.

The triple valve device 1 may comprise a casing having a piston chamber 9, which is connected to the brake pipe 3 through a passage and pipe 10 and contains a piston 11 having a stem 12 adapted to operate a main slide valve 13 and an auxiliary slide valve 14 contained in a chamber 15, which is connected to the auxiliary reservoir through a passage and pipe 16 and which when the piston 11 is in release position, as shown, is connected with the piston chamber 9 through the usual feed groove 17 around the piston.

The usual lost motion connection is provided between the main slide valve 13 and the piston stem 12 whereby the piston and stem is permitted to move initially without effecting movement of the main slide valve. The graduating valve 14, however, moves with the piston. Consequently, the graduating valve 14 moves in the usual manner relative to the main slide valve.

The quick service modifying valve device is mounted in a casing 19 which is secured to the triple valve casing 18. Clamped between the casings 18 and 19 is a flexible diaphragm 21 having at one side a chamber 22 which is open to the atmosphere through a passage 23 and having at the other side a chamber 24. Contained within a chamber 25 in the casing 19 is a quick service modifying valve 26 having a fluted stem 27 which extends through a bore or passage 28 in the partition 29 that separates the chamber 24 from the chamber 25.

The chamber 25 is closed by a cap nut 31 and a spring 32 disposed between the upper end of the valve 26 and the cap nut 31 serves to bias the valve 26 toward closed position, wherein it closes the communicating passage 28 between the chamber 25 and the chamber 24.

The valve 26 is normally retained in open position against the tension of the spring 32 by the diaphragm 21 having a hub nut 34 which engages the stem 27 of the valve 26 and which is biased into raised position shown, by the spring 33 that overcomes the tension of the spring 32. When the pressure in the chamber 24 exceeds a predetermined degree, the diaphragm 21 is deflected to its lower position against the action of the spring 33 and permits the spring 32 to seat the valve 26.

The check valve device is also contained in the casing 19 and comprises a diaphragm 35 that is clamped between the casings 18 and 19 and having on one side a chamber 36 that is open to the atmosphere through the passage 23 and having at the other side a chamber 37 that communicates with the chamber 24 of the quick service modifying valve device through the passage 38. Contained in a chamber 39 is a check valve 41 which controls communication by way of opening 43 from chamber 37 to chamber 39. The chamber 39 is closed by a threaded cap nut 45 and the valve 41 is biased toward its lowest position in engagement with the seat rib 42 by means of a spring 46 that is disposed between the upper side of the valve 41 and cap nut 45.

The diaphragm 35 carries a hub 48 having a stem 49 which extends through the valve opening 43 and engages the check valve 41. A spring 47 in the chamber 36 serves to bias the diaphragm into its upper position and normally retains the check valve 41 in open position against the tension of the spring 46.

A pressure retaining valve device 4 is provided for the purpose of retaining, during a cycling operation, a predetermined pressure in the brake cylinder when the handle 51 on the device is moved from a position in which it is shown to its retaining position. With the handle in the position shown, the device establishes a direct communication to the atmosphere through which fluid under pressure may be completely vented from the brake cylinder. This retaining valve device 4 may be of the usual well known construction, therefore, a detailed description of the same is deemed unnecessary.

In charging the equipment, fluid under pressure supplied through the brake pipe 3 in the usual manner, flows to the triple valve piston chamber 9 by way of pipe and passage 10. With the triple valve piston 11 in release position, as shown in the drawing, fluid under pressure thus supplied to the piston chamber, flows therefrom to the auxiliary reservoir 2, by way of the feed groove 17, valve chamber 15 and passage and pipe 16.

With the triple valve parts in release position, as shown, the brake cylinder is open to the atmosphere through pipe and passage 52, cavity 53 in the main slide valve 13 of the triple valve device, passage and pipe 54 and through the retainer valve device 4.

When, in order to effect an application of the brakes, an initial reduction in brake pipe pressure is made by operation of the engineer's automatic brake valve, not shown, a corresponding reduction in the pressure of fluid in the triple valve piston chamber 9 occurs, so that fluid under pressure in the slide valve chamber 15, causes the triple valve piston 11 to move outwardly from release position toward application position.

The piston 11 as it thus moves, first closes the feed groove 17 and operates the piston stem 12 to shift the auxiliary slide valve 14 relative to the main slide valve 13 until the rear end of the stem operatively engages the rear end of the main slide valve 13.

By this relative movement of the auxiliary slide valve 14, the service port 70 is uncovered, and ports 56 and 57 through the main slide valve 13 are connected through cavity 55. Since ports 56 and 57 register, in the release position of the main slide valve, with passages 60 and 58, respectively, fluid under pressure is vented from the brake pipe 3 to the quick service bulb 5 by way of pipe and passage 10, past the ball check valve 63 in the passage 60, port 56 in the main slide valve, cavity 55 in the auxiliary slide valve, port 57 in the main slide valve, passage 58, past the ball check valve 61 in the chamber 59, passage 62, chamber 25, past the normally open quick service modifying valve 26, through the valve opening 28, valve chamber 24, passage 38, chamber 37 in the check valve device, valve opening 43, past the unseated check valve 41, chamber 39 and passage and pipe 64.

When the pressure of fluid supplied from the brake pipe to the quick service bulb 5, as above described, which exists in chambers 24 and 37, slightly exceeds the pressure of spring 47, the diaphragm 35 will be flexed downwardly, permitting the valve 41 to be seated by the spring 46. For reasons to be hereinafter defined, the pressure of spring 47 may be such, for example, that the diaphragm will be deflected downwardly, when the pressure in chamber 37 slightly exceeds seven pounds. Consequently, the check valve 41 is free to close and prevent back flow of fluid from the quick service bulb so long as the pressure in the chamber 37 exceeds a predetermined degree. The spring 46 which moves the check valve 41 into engagement with the seat rib 42 is relatively weak and readily permits fluid to flow from the chamber 37 into the chamber 39 and thence to the bulb 5 through the passage and pipe 64.

Fluid under pressure initially flows rapidly into the quick service bulb 5 and effects a local reduction in brake pipe pressure which produces quick serial action throughout the train and insures movement of the triple valve to service application position as a result of the reduction in fluid pressure in the piston chamber 9. The higher fluid pressure in the valve chamber 15 of the triple valve device accelerates the movement of the piston 11 to the service application position, carrying the main slide valve 13 to the service application position, wherein the ports 56 and 57 are moved out of registry with the passages 60 and 58, respectively, and wherein, a passage 66 in the main slide valve and having a restricted passage 65 therein, connects the passage 60 and the passage 58.

Fluid under pressure then flows from the brake pipe 3 to the bulb 5 at a restricted rate through pipe and passage 10, passage 60, past the check valve 63, cavity 66 and restricted passage 65 in the main slide valve 13, passage 58, past the ball check valve 61, chamber 59, passage 62, chamber 25, past the normally open quick service modifying valve 26, through valve opening 28, chamber 24, passage 38, chamber 37, valve opening 43, past the check valve 41, chamber 39, and the passage and pipe 64.

It will be seen from the foregoing that with the triple valve parts in the application position, a further reduction in brake pipe pressure is effected which is sufficient to insure the triple valve piston and consequently the slide valves remaining in a position to so supply fluid under pressure to the brake cylinder that an effective brake cylinder pressure will be developed. The rate at which this quick service reduction in brake pipe pressure is effected in service position is relatively slow so as to dampen or smooth out any surges of fluid in the brake pipe which may have been caused upon effecting the initial local reduction in brake pipe pressure.

Fluid under pressure continues to flow slowly from the brake pipe into the quick service bulb 5 until the pressure in the quick service bulb 5 and in the chamber 24 is sufficient to overcome the tension of the spring 33 by reason of the fluid pressure on the upper side of the flexible diaphragm 21. When the pressure in the chamber 24 moves the diaphragm 21 to its lower position, the quick service modifying valve 26 is moved to seated or closed position by the spring 32, in which position communication between the brake pipe and the quick service bulb is closed and cuts off further venting of fluid from the brake pipe when the pressure in the bulb has been increased by flow from the brake pipe to a predetermined degree, such as forty-seven pounds.

The quick service modifying valve 26, therefore, serves to definitely limit the quantity of fluid that may be vented from the brake pipe into the quick service bulb 5 and correspondingly limits the amount of brake pipe pressure reduction in the vicinity of each triple valve device, regardless of the previously existing degree of brake pipe pressure in the vicinity of the triple valve device.

When the main slide valve has been moved to service application position, the port 70 in the main slide valve registers with the passage and pipe 52 and is uncovered by the auxiliary valve 14 and communication is therefore established between the auxiliary reservoir and the brake cylinder 8 through pipe and passage 16, valve chamber 15, port 70 in the main slide valve 13 and passage and pipe 52. Fluid under pressure continues to flow from the auxiliary reservoir 2 to the brake cylinder 8 until the pressure in the valve chamber 15 is reduced below that in the piston chamber 9, at which time the piston 11 is moved sufficiently to cause the auxiliary valve 14 to lap the port 70 in the main slide valve and close communication between the auxiliary reservoir and brake cylinder.

Since the force with which the brakes are applied is in accordance with the amount of reduction in pressure in the brake pipe, the brakes may be applied with a definite force by regulating the local reduction in brake pipe pressure to a predetermined amount. It has been found that in relatively long trains having one hundred cars, more or less, the gathering of the slack may be satisfactorily controlled when a substantially uniform brake cylinder pressure is obtained on the cars of the train during the initial light quick service application of the brakes.

It is desirable, therefore, to so adjust the local quick service means that the local reduction in brake pipe pressure on cars at the rear of the train will be sufficient to cause the brake cylinder pressure to be built up to a predetermined degree in the initial application of the brakes, under conditions of maximum leakage likely to occur in the train.

For example, with a normal standard brake pipe pressure of seventy pounds the pressure in the brake pipe on cars at the rear of the train may be fifty-five pounds. Now, if it is desired to cause a local reduction in brake pipe pressure of say eight pounds, then the spring 33 is of such resistance that when the pressure in the brake pipe has been reduced from fifty-five to forty-seven pounds, the diaphragm 21 will be operated to permit the valve 26 to close and thus prevent the further venting of fluid from the brake pipe to the bulb.

Thus a desirable brake cylinder pressure of substantially eleven pounds is obtained on the cars at the rear of the train. By so adjusting the springs 33 of the triple valve devices on all of the cars of the train as to permit the respective valves 26 to close when the pressure in the respectively associated bulbs attains forty-seven pounds, like local reductions in brake pipe pressure will occur on each car of the train.

Since with my improvement the reduction in brake pipe pressure on each car is limited to a predetermined degree, such as eight pounds, the brake pipe pressure obtained on each car will be limited to correspond with that obtained by an eight pound reduction in brake pipe pressure.

As the initial application of the brakes on the front cars of the train is made with substantially the same force as is applied to the brakes of the rear cars of the train, the slack is prevented from running in so harshly as to occasion severe shocks.

It will be understood that when communication is established between the brake pipe and the quick service bulb on the first car of the train through movement of the auxiliary slide valve 14 to connect the ports 56 and 57 in the main slide valve, the local reduction in brake pipe pressure produced by flow of fluid from the brake pipe into the quick service bulb, accelerates the reduction in brake pipe pressure on the second car to facilitate movement of the piston 11 in the triple valve device of the second car to its initial brake application position, thereupon causing a similar local reduction in brake pipe pressure which is transmitted to the triple valve device of the third car, and so on. In this manner, operation of the triple valve devices on the succeeding cars is accelerated.

After the initial substantially uniform application of brakes on all of the cars of the train is completed and the slack of the train substantially gathered without severe shocks, a subsequent reduction in brake pipe pressure due to further venting of the brake pipe at the engineer's brake valve will cause the usual operation of the triple valve device to permit the further flow of fluid from the auxiliary reservoir to the brake cylinder.

The bulb 5 being fully charged as the result of the initial quick service application and the check valve 41 being at this time closed as previously explained, the fluid vented to the bulb is retained therein.

In order to release the brakes, the brake pipe pressure is increased in the usual manner and when the pressure in the piston chamber 9 exceeds that in the valve chamber 15, the piston 11 returns the main and auxiliary slide valves to the release position shown, wherein, the brake cylinder communicates with the atmosphere through the pipe and passage 52, cavity 53 in the main slide valve, passage and pipe 54 and the retaining valve 4.

The chambers 24 and 37 connected through the passage 38 are in communication with the atmosphere through the passage 67, restricted passage 68 in the choke plug 69, passage 71, passage 72 in the main slide valve, cavity 53, passage and pipe 54 and the normally open retaining valve 4, and fluid may exhaust therefrom to the atmosphere. When the pressure in the chamber 24 falls below forty-seven pounds, the quick service modifying valve 26 is moved to open position by the upward deflection of the diaphragm 21 by the spring 33, and when the pressure falls below seven pounds within the chamber 37 the spring 47 deflects the diaphragm 35 upwardly and lifts the check valve 41 from its seat. Fluid may then flow from the quick service bulb 5 to the atmosphere through the pipe and passage 64, chamber 39, past the check valve 41 through valve opening 43, chamber 37, passage 67, restricted passage 68, passage 71, passage 72 in the main slide valve, cavity 53, passage and pipe 54 and the normally open retaining valve device 4.

When the quick service modifying valve 26 and the check valve 41 are moved to the unseated or open position shown and when the quick service bulb 5 has exhausted to the atmosphere, the brake controlling equipment is in readiness for another quick service application.

During a cycling operation of the brakes, as when the train is descending a long grade, the retaining valve devices 4 on all of the cars of the train are turned to their retaining position so that when the triple valve device is moved to release position, a pressure of twenty pounds will be retained in the brake cylinder.

On the initial application in cycling, the quick service action is the same as hereinbefore described. When the triple valve is moved to release position prior to effecting a second application of the brakes, and the retaining valve is in the retaining position, the pressure in chamber 37 is maintained by flow from the brake cylinders through passage 67 so that the diaphragm 35 remains deflected and the check valve 41 is held seated, preventing the escape of fluid previously vented to the bulb. As a result, on the second brake application in cycling, fluid is not vented to the bulb.

Summarizing, the improved fluid brake equipment comprises the addition to the usual triple valve device and quick service bulb, of a valve device that is responsive to pressure within the bulb for regulating and determining the quantity of fluid under pressure that may be discharged from the brake pipe into the quick service bulb regardless of the previously existing degree of brake pipe pressure in the vicinity of the triple valve device. By reason of the provision of the pressure responsive valve device, a local reduction in brake pipe pressure of substantially the same amount is made at each triple valve device regardless of the brake pipe pressure gradient from the front end of the train to the rear end thereof and regardless of whether the train brake system is operated on the usual brake pipe pressure of seventy pounds maintained at the front end of the train or on a higher brake pipe pressure. Whether the brake pipe pressure at the head end of the train is one-hundred and ten pounds, ninety pounds or seventy pounds, the initial force of brake application during a light quick service application of the brakes is a predetermined force and substantially uniform on all of the cars of the train unless extraneous influences, such as leakage in the system, or further reduction in brake pipe pressure at the brake valve become effective to increase the brake cylinder pressure.

A check valve device is provided for preventing the back flow of fluid from the quick service bulb into the brake pipe and for retaining the fluid under pressure within the quick service bulb so as to render it ineffective for producing quick service brake application during cycling operation or during a service application of the brakes subsequent to a quick service application thereof. Means are therefore provided for rendering the automatic brake valve device on a locomotive effective for controlling service applications of the brakes subsequent to the initial light quick service application thereof.

While I have disclosed but one embodiment of the invention, it is obvious that many changes, additions and omissions may be made therein without departing from the spirit of the invention.

Having now described my invention, what I claim as new and desire to secure by Letters Patent, is:

1. In a fluid pressure brake, the combination with a brake pipe and a brake controlling valve device operated upon a reduction in brake pipe pressure for effecting an application of the brakes, of means controlled by said valve device for locally venting fluid from the brake pipe upon a reduction in brake pipe pressure, a bottling chamber into which only fluid under pressure locally vented from the brake pipe is received, and means operated upon a predetermined increase in the pressure of fluid locally vented into said chamber for cutting off the venting of fluid from the brake pipe.

2. In a fluid pressure brake, the combination with a brake pipe and a brake controlling valve device operated upon a reduction in brake pipe pressure for effecting an application of the brakes, of means for effecting a local venting of fluid from the brake pipe to a chamber of fixed volumetric capacity, and means operated by a predetermined increase in the pressure of fluid vented from the brake pipe to said chamber for cutting off the venting of fluid from the brake pipe.

3. In a fluid pressure brake, the combination with a brake pipe and a brake controlling valve device operated upon a reduction in brake pipe pressure for effecting an application of the brakes, of means for effecting a local venting of fluid from the brake pipe to a chamber of fixed volumetric capacity, a spring, valve means subject to the opposing pressures of said spring and said chamber for controlling communication from the brake pipe to said chamber and operated when the pressure of fluid supplied to said chamber from the brake pipe exceeds the pressure of said spring for cutting off said communication.

4. In a fluid pressure brake, the combination with a brake pipe, a valve device operative upon a reduction in brake pipe pressure to effect an application of the brakes, of means operative to locally vent fluid under pressure from the brake pipe when said valve device is operated to effect an application of the brakes, a bottling chamber into which only fluid under pressure locally vented from the brake pipe is received, and means controlled according to the pressure of the fluid within the said chamber for cutting off the local venting of fluid under pressure from the brake pipe.

5. In a fluid pressure brake, the combination with a brake pipe and a brake cylinder, of a brake controlling valve device operative upon a reduction in brake pipe pressure to locally vent fluid under pressure from the brake pipe and to supply fluid under pressure to the brake cylinder to effect an application of the brakes, a chamber into which fluid under pressure locally vented from the brake pipe is received, valve means for cutting off the local venting of fluid under pressure from the brake pipe, and means controlled according to the increase in the fluid pressure within said chamber and independently of brake cylinder pressure for causing said valve means to cut off the local venting of fluid under pressure from the brake pipe.

6. In a fluid pressure brake, the combination with a brake pipe and a triple valve device responsive to a reduction in brake pipe pressure for effecting an application of the brakes, of means controlled by the triple valve device for locally venting fluid under pressure from the brake pipe, a bottling chamber into which only fluid under pressure locally vented from the brake pipe is received, valve means operative to cut off the local venting of fluid under pressure from the brake pipe, and means operated upon a predetermined increase in the pressure of the fluid within the said chamber for effecting the operation of said valve means to cut off the venting of fluid under pressure from the brake pipe.

7. In a fluid pressure brake, the combination with a brake pipe and a brake cylinder, of a brake controlling valve device operative upon a reduction in brake pipe pressure to locally vent fluid under pressure from the brake pipe and to supply fluid under pressure to the brake cylinder to effect an application of the brakes, a chamber into which fluid under pressure locally vented from the brake pipe is received, valve means for cutting off the local venting of fluid under pressure from the brake pipe, and means operative responsively to a predetermined fluid pressure within the said chamber and independently of brake cylinder pressure for causing said valve means to cut off the local venting of fluid under pressure from the brake pipe.

8. In a fluid pressure brake, the combination with a brake pipe, a reservoir, a brake cylinder, and a valve device responsive to a reduction in brake pipe pressure for controlling the delivery of fluid under pressure from the reservoir to the brake cylinder for effecting an application of the brakes in accordance with the reduction in brake pipe pressure, of means controlled by said valve device for venting fluid under pressure from the brake pipe, a bottling chamber into which fluid under pressure locally vented from the brake pipe is received, and means controlled by the pressure of the fluid within the said chamber for permitting only a predetermined definite quantity of fluid under pressure to be vented from the brake pipe.

9. In a fluid pressure brake, the combination with a brake pipe, a reservoir, a brake cylinder and a valve device responsive to a reduction in brake pipe pressure for controlling the delivery of fluid from the reservoir to the brake cylinder for effecting an application of the brakes in accordance with the said pressure reduction and for locally venting fluid under pressure from the brake pipe, of a bulb for receiving fluid locally vented from the brake pipe, and a means responsive to the pressure of fluid in the bulb for definitely limiting the quantity of fluid delivered to the bulb.

10. In a fluid pressure brake, the combination with a brake pipe and a brake controlling valve device operated upon a reduction in brake pipe pressure for effecting an application of the brakes, of a chamber of fixed volumetric capacity, means for effecting a local venting of fluid from the brake pipe to said chamber at a rapid rate and subsequently at a slower rate, and means operated by a predetermined increase in the pressure of fluid vented from the brake pipe to said chamber for cutting off the venting of fluid from the brake pipe to said chamber.

11. In a fluid pressure brake, the combination with a brake pipe and a triple valve device responsive to a reduction in brake pipe pressure for effecting an application of the brakes, of means controlled by the triple valve device for locally venting fluid under pressure from the brake pipe successively at different predetermined rates, and means for cutting off the local venting of the fluid from the brake pipe when a predetermined quantity of fluid has been locally vented therefrom.

12. In a fluid pressure brake, the combination with a brake pipe and a triple valve device responsive to a reduction in brake pipe pressure for effecting an application of the brakes, of means controlled by the triple valve device and adapted when said device is in one position to locally vent fluid under pressure from the brake pipe at a predetermined rate and when said device is in another position to vent fluid under pressure at another predetermined rate, a chamber into which fluid under pressure locally vented from the brake pipe is received, and means for cutting off the venting of fluid from the brake pipe controlled by the pressure of the fluid in said chamber.

13. In a fluid pressure brake, the combination with a brake pipe and a triple valve device responsive to a reduction in brake pipe pressure for effecting an application of the brakes, of a chamber, means controlled by the triple valve device for locally venting fluid under pressure from the brake pipe to said chamber successively at different predetermined rates, and means for cutting off the local venting of the fluid from the brake pipe when a substantially predetermined quantity of fluid has been locally vented from the brake pipe into said chamber.

14. In a fluid pressure brake, the combination with a brake pipe and a triple valve device responsive to a reduction in brake pipe pressure for effecting an application of the brakes, of a chamber of fixed volumetric capacity, means controlled by the triple valve device for locally venting fluid under pressure from the brake pipe to said chamber successively at different predetermined rates, and means operated when the pressure of the fluid vented from the brake pipe to said chamber attains a predetermined value for cutting off the venting of fluid from the brake pipe into said chamber.

15. In a fluid pressure brake, the combination with a brake pipe and a brake controlling valve device operated upon a reduction in brake pipe pressure for effecting an application of the brakes, of means controlled by said valve device for locally venting fluid under pressure from said brake pipe, and means for controlling the fluid locally vented from the brake pipe to permit a predetermined definite quantity of fluid to be vented from the brake pipe, said last means including a chamber into which fluid under pressure locally vented from the brake pipe is received, valve means operable to cut off the flow of fluid locally vented from the brake pipe, and means operated upon a predetermined increase in the pressure of fluid locally vented into said chamber for causing said valve means to operate to cut off the flow of fluid locally vented from the brake pipe.

16. In a fluid pressure brake, the combination with a brake pipe, a brake cylinder, and a brake controlling valve device operated upon a reduction in brake pipe pressure to supply fluid under pressure to the brake cylinder for effecting an application of the brakes, of a chamber, means controlled by said brake controlling valve device for locally venting fluid under pressure from said brake pipe to said chamber upon a reduction in brake pipe pressure, check valve means for preventing back flow of fluid from said chamber, valve means for controlling the supply of fluid vented into said chamber, and means controlled by the pressure of fluid admitted to said chamber and independently of brake cylinder pressure for causing said valve means to cut off the venting of fluid under pressure from the brake pipe to the chamber when the pressure in said chamber attains a predetermined value.

17. In a fluid pressure brake, the combination with a brake pipe, a brake cylinder, and a brake controlling valve device operative upon a reduction in brake pipe pressure to cause fluid under pressure to be supplied to the brake cylinder to effect an application of the brakes and operative upon an increase in brake pipe pressure to cause fluid under pressure to be vented from the brake cylinder to effect release of the brakes, of a chamber, means controlled by said brake controlling valve device and effective, upon an application of the brakes being effected, to cause fluid under pressure to be locally vented from the brake pipe to said chamber, a valve operative to cut off the supply of fluid under pressure to said chamber, means controlled by the pressure of the fluid built up in said chamber for operating said valve to cut off the further supply of fluid under pressure to the chamber when the pressure in the chamber attains a predetermined uniform value, a check valve effective to prevent back flow of fluid under pressure from the said chamber, and means controlled by the pressure of fluid in the brake cylinder when said brake controlling valve device is operated to effect release of the brakes, for rendering the check valve ineffective to prevent back flow of fluid under pressure from the said chamber after the brake cylinder pressure reduces below a predetermined uniform value.

ELLERY R. FITCH.